H. K. PINKERTON ET AL

Aug. 25, 1931. FOUNTAIN TANK Re. 18,169

Original Filed Oct. 14, 1926

INVENTORS
Howard K. Pinkerton
Freeman L. Rhyndress.
BY
Arthur C. Brown
ATTORNEY

Reissued Aug. 25, 1931 Re. 18,169

UNITED STATES PATENT OFFICE

HOWARD K. PINKERTON, OF MADISON, WISCONSIN, AND FREEMAN L. RHYNDRESS, OF KANSAS CITY, MISSOURI, ASSIGNORS, BY MESNE ASSIGNMENTS, TO GENERAL ELECTRIC COMPANY, A CORPORATION OF NEW YORK

FOUNTAIN TANK

Original No. 1,692,223, dated November 20, 1928, Serial No. 141,505, filed October 14, 1926. Application for reissue filed August 13, 1929. Serial No. 385,622.

Our invention relates to water coolers and more particularly to a new and improved cooling tank for water that is connected directly with the water supply.

It is a purpose of our invention to provide a water cooler comprising a tank, or other suitable reservoir, mounted in an insulated receptacle provided with refrigerating means that has a constantly open outlet connection and a valved inlet connection, the outlet connection being preferably located near the top of the tank so that the tank is substantially entirely filled with water at all times.

It is a further purpose of our invention to provide a tank in a water cooler having an inlet near the top and adjacent one end thereof and an outlet near the top and adjacent the other end thereof and means in the tank to provide a circuitous passage for the water from the inlet to the outlet. The circuitous passage is preferably obtained by providing baffle members in the form of plates extending from oppositely arranged wall portions, such as the top and bottom, of the tank, those extending from the top terminating short of the bottom and those extending from the bottom terminating short of the top, said baffle members being arranged alternately.

Other objects and advantages of the invention will appear as the description of the acompanying drawings proceeds. However, we desire to have it distinctly understood that we do not intend to limit ourselves to the exact details shown or described, but that we intend to include as part of our invention all such obvious changes and modifications of parts as would occur to a person skilled in this art and as would fall within the scope of the claims.

Referring in detail to the drawings:—

Figure 1:
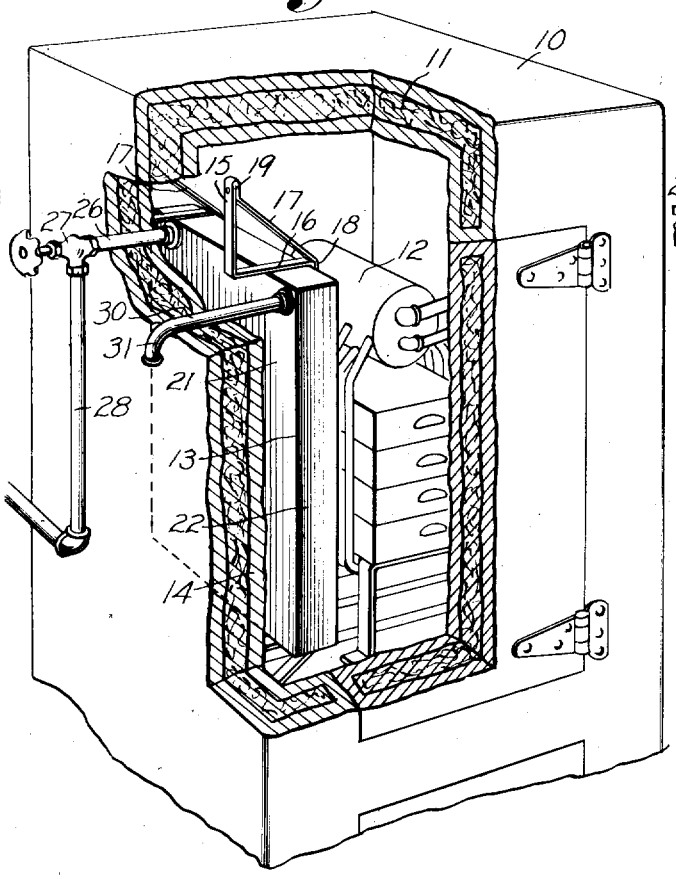
Fig. 1 is a perspective view of a portion of a refrigerator, partly broken away, showing our improved water cooler in position therein.
Figure 2:
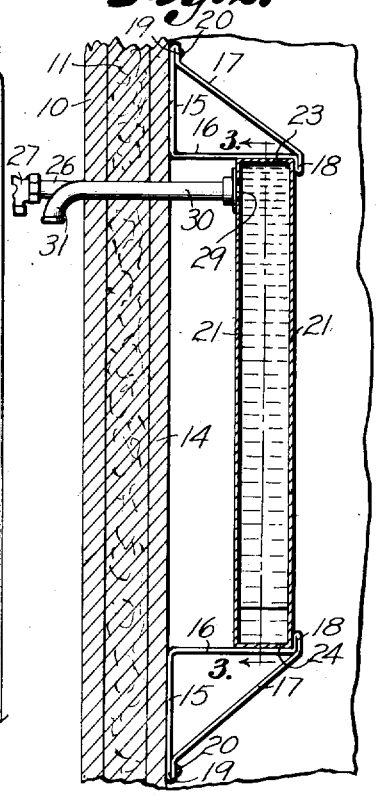
Fig. 2 is a fragmentary sectional view on an enlarged scale of the water cooler and the adjoining wall portion of the refrigerator.

Our improved water cooling device is preferably mounted in an insulated receptacle such as a refrigerator 10 which is, of course, provided with insulating material 11 in the walls thereof. The water cooler is preferably arranged closely adjacent suitable refrigerating means which may be any refrigerant or a mechanical refrigerating device such as that indicated at 12 which is operated by electric power.

Our improved water cooler comprises a tank 13, or other suitable reservoir, which is supported from one of the vertically extending walls 14 of the receptacle 10 by means of the bracket members 15 secured flatly against the wall 14 and having substantially horizontally extending portions 16 and obliquely extending bracing portions 17 with two-ply flange portions 18 joining the portions 16 and 17, said flanges being turned downwardly on the upper brackets and upwardly on the lower brackets to support the tank 13 and hold the same in proper position. If desired, the tank 13 may be secured to the brackets 15 in any suitable manner. The brackets 15 are also provided with the two-ply flange portions 19 through which the fastening elements 20 may extend.

The tank 13 is preferably made rectangular in form being relatively tall and long and thin, that is, the vertically extending walls 21 are preferably spaced only a slight distance apart and are relatively large in area while the end walls 22 and the top and bottom walls 23 and 24 respectively, are of relatively small area; thus a tank is provided that has a very large area exposed to the cooling means. The walls 21 are of course substantially parallel to each other as are also the walls 22 and the walls 23 and 24.

Figure 3:
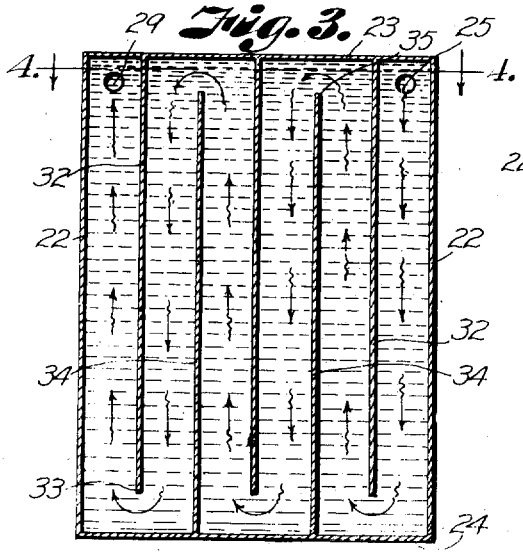
Fig. 3 is a section taken on the line 3—3 of Fig. 2.
Figure 4:
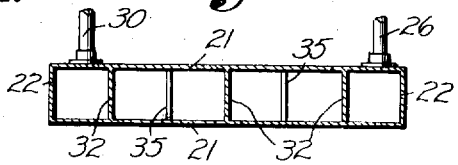
Fig. 4 is a section taken on the line 4—4 of Fig. 3.

An inlet 25 is provided adjacent one end of the tank near the top thereof with which is connected the inlet pipe 26 which is provided with a valve 27 for controlling the supply of water from the city water supply 28 or any other suitable water supply pipe under pressure. Near the opposite end and top of the tank is an outlet 29 with which the outlet pipe 30 is connected, that may be in any suitable form but is shown with a down-turned end portion 31 forming a spout, said outlet connection 30 being always open into the tank 13. Mounted within the tank and extending downwardly from the top 23 thereof are the baffle plates 32, said plates extending from one side 21 to the other side 21 and being provided with the free ends 33 spaced from the bottom 24 substantially the same distance as the distance between the endmost plates 32 and the walls 22. Alternating with the plates 32 are baffle plates 34 which extend from the bottom 24 and also extend from one side 21 to the other side 21. The baffle plates 34 are provided with free end portions 35 that are spaced substantially the same distance from the top 23 that the ends 33 of the plates 32 are spaced from the bottom 24. Furthermore, the plates 32 and 34 are spaced substantially equal distances apart to thus provide a circuitous passage of substantially uniform width from the inlet 25 to the outlet 29. Accordingly when the valve 27 is open, water will flow through the tank 13 in the direction indicated by the arrows in Fig. 3, the entrance of the comparatively warm water through the inlet 26 moving the cold water in the tank 13 out through the outlet 30. Thus a circulation of water in the tank 13 is obtained every time the inlet valve 27 is opened and due to the fact that the outlet connection is free and unrestricted the water will circulate readily in the tank 13 as indicated in Fig. 3. Thus a very simple construction of cooler is provided and due to the position of the valve 27 the city water pressure is not exerted on the tank 13, thus making it possible to use a relatively light construction of tank and avoiding any chance of leakage due to excessive pressure thereon.

What we claim and desire to secure by Letters Patent is:—

1. In a device of the character described, an insulated receptacle, refrigerating means therein, a tank mounted in said receptacle having an inlet adjacent one end thereof and an unobstructed outlet adjacent the other end thereof, means exterior to the tank for controlling the inlet and baffle members in said tank between said inlet and said outlet.

2. In a device of the character described, an insulated receptacle, refrigerating means therein, a relatively tall, thin and long tank mounted in said receptacle having a valve inlet adjacent one end thereof and an unobstructed outlet adjacent the other end thereof and baffle members in said tank between said inlet and said outlet, said baffle members extending alternately from the top and bottom of said tank and terminating in spaced relation respectively to said bottom and top.

3. In a device of the character described, a tank having a free outlet from its upper portion and having a valved supply intake provided with manual control means exterior to the tank whereby withdrawal of liquid from the tank is controlled at the intake.

4. In a device of the character described, a tank having spaced intake and outlet conduits, the outlet conduit being in connection with the upper portion of the tank unobstructed and the intake conduit having valve control exterior to the tank whereby discharge from the tank is effected by pressure of incoming fluid on contents of the tank when the intake conduit is opened.

5. In a device of the character described, an insulated receptacle, refrigerating means therein, a reservoir mounted in said receptacle having an outlet and being arranged to maintain a body of water therein, a water pressure supply pipe, and a valved water inlet leading into said reservoir and connected to said water pressure supply pipe, said outlet being continuously open so as to prevent said reservoir being subjected to the full pressure of said pipe.

6. In a device of the character described, an insulated receptacle, refrigerating means therein, a tank mounted in said receptacle, an outlet connection therefor, a water pressure supply pipe for supplying water under pressure, and a valved water inlet leading into said tank and connected to said pressure supply pipe, said outlet connection being continuously open so as to prevent said tank being subjected to the full pressure of said pressure supply pipe and being arranged to retain a body of water in said tank.

7. In a device of the character described, an insulated receptacle, refrigerating means therein, a tank of light construction in said receptacle, a water pipe for supplying water under pressure, a valved inlet to said tank for connecting the same to said pipe, and means independent of said inlet valve and constituting an outlet for preventing the tank being subjected to the pressure of said pipe and for retaining a body of water in said tank.

In witness whereof, the said HOWARD K. PINKERTON has set his hand this 8th day of July, 1929, and the said FREEMAN L. RHYNDRESS has set his hand this 18th day of July, 1929.

HOWARD K. PINKERTON.
FREEMAN L. RHYNDRESS.